Patented June 19, 1923.

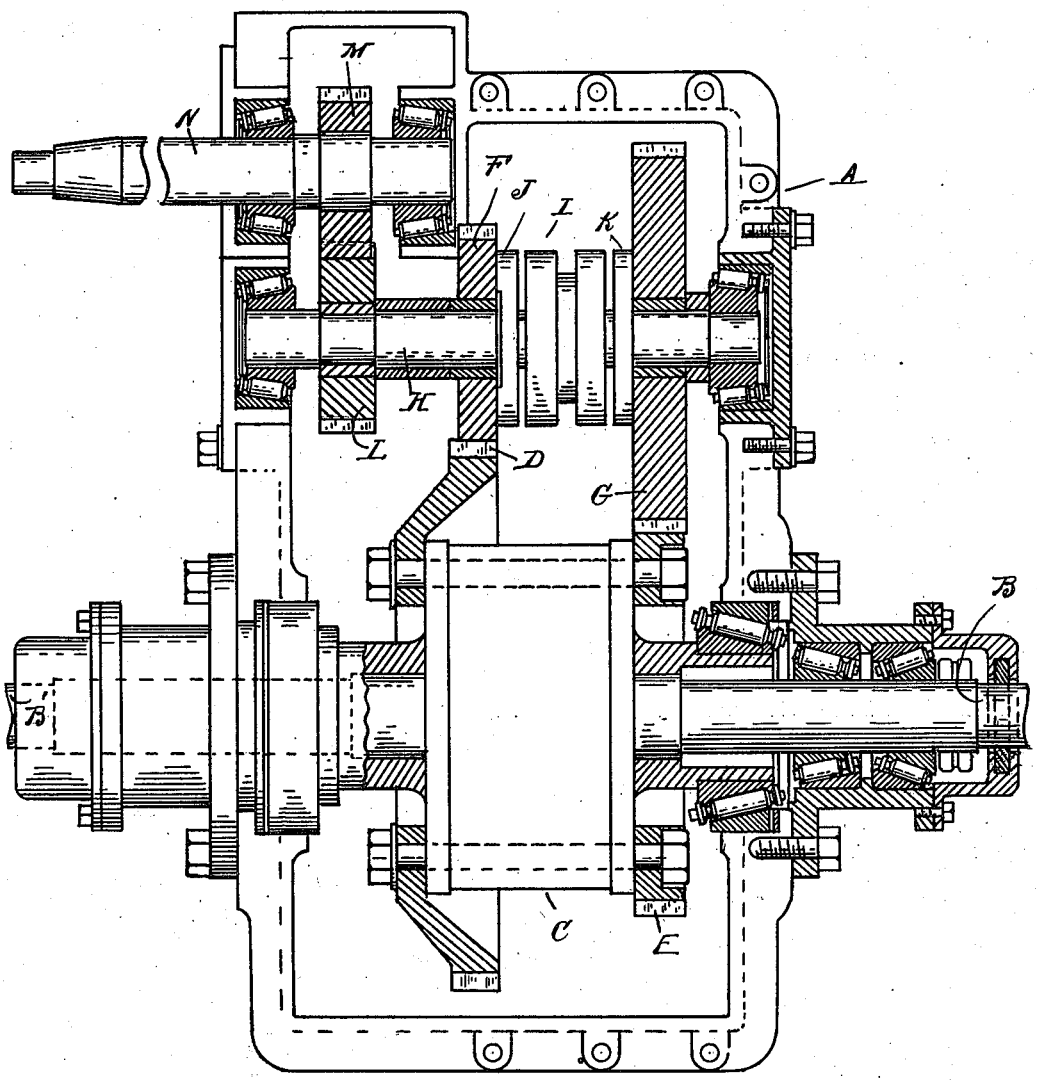

1,459,026

UNITED STATES PATENT OFFICE.

CHARLES E. KOCHER, OF DETROIT, MICHIGAN, ASSIGNOR TO THE WYANDOTT-MOR-POWR TRUCK COMPANY, OF WYANDOTTE, MICHIGAN, A CORPORATION OF MICHIGAN.

TRANSMISSION MECHANISM.

Application filed November 21, 1921. Serial No. 516,547.

*To all whom it may concern:*

Be it known that I, CHARLES E. KOCHER, a citizen of the United States of America, residing at Detroit, in the county of Wayne and State of Michigan, have invented certain new and useful Improvements in Transmission Mechanism, of which the following is a specification, reference being had therein to the accompanying drawings.

The invention relates to transmission mechanisms particularly designed for use in connection with four-wheel drive vehicle and the invention consists in the construction as hereinafter set forth.

The drawing represents the transmission in longitudinal section.

In the four-wheel drive type of vehicles it is necessary that all of the wheels must be capable of rotating differentially under certain conditions, such, for instance, as when the vehicle is turning. This requires not only the usual differential gearing in the axles, but also a differential gearing between axles. With the present invention I have designed a transmission unit which includes in addition to the change speed gears, means for differentially driving a plurality of shafts which lead to the axles.

In detail, A is a transmission housing having arranged in the lower portion thereof a pair of aligned driven shafts B and B' with a differential gearing C arranged therebetween. D and E are two annular gears connected to the differential gearing C for alternatively driving the same. The gear D is preferably dished as shown and the teeth thereof preferably surround the differential gearing. These annular gears are respectively in mesh with spur gears F and G, which are sleeved upon a shaft H in the upper portion of the housing. I is a clutch arranged upon the shaft H intermediate the gears F and G, and J and K are cooperating clutch members on said gears F and G which are alternatively engaged by the clutch member I. The ratios of the gears F, D and G, E are different and thus the power and speed of drive may be altered by adjustment of the clutch member I. L is a driving gear on the shaft H which is in mesh with a pinion M on a shaft N, which may be driven from the main clutch. Thus in the one housing is included; first, a step-down transmission, pinion M and gear L; second, a variable speed transmission and pairs gears F, D and G, E; third, a differential gearing through which a plurality of shafts are driven. The mechanism is all compactly arranged and the whole structure is one which may be conveniently mounted on a motor vehicle and which will provide easy access to the parts for adjustment and repairs.

What I claim as my invention is:

A transmission for motor vehicles comprising a housing having substantially parallel side walls, a pair of aligned driven shafts journaled in the side walls of said housing, a differential gearing disposed in said housing and operatively arranged between the adjacent ends of said shafts, annular gears surrounding said shafts and engaging opposite sides of said differential gearing, a common means for securing both of said gears to said differential gearing for alternately driving the same, a shaft parallel to the shafts aforesaid journaled in the side walls of said housing, a pair of spur gears sleeved upon the second-mentioned shaft and constantly in mesh with said annular gears, the ratio of said spur gears and said annular gears being different, one of said annular gears being dished, the teeth of said dished gear surrounding said differential gearing whereby the spur gear in mesh therewith is disposed substantially midway between the side walls of said housing, a clutch between said spur gears for alternately coupling the same to the second-mentioned shaft, a gear on the second-mentioned shaft between the adjacent spur gear and one side wall of said housing, a drive shaft parallel to the shafts aforesaid journaled in bearings disposed within said housing, said bearings being located between one of said spur gears and a side wall of said housing, and a gear on said drive shaft in mesh with the last-mentioned gear for rotating the second-mentioned shaft.

In testimony whereof I affix my signature.

CHARLES E. KOCHER.